Patented Jan. 14, 1941

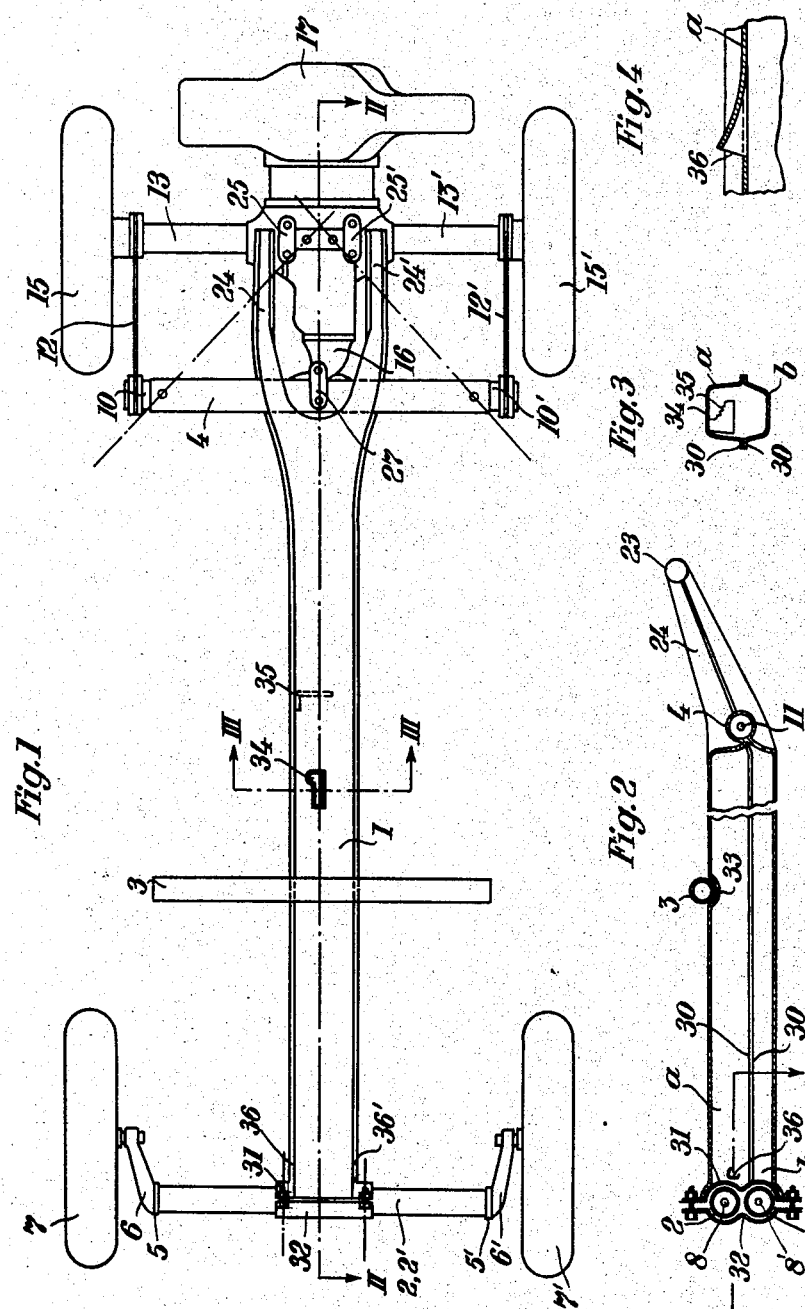

2,228,732

UNITED STATES PATENT OFFICE 2,228,732

VEHICLE FRAME CONSTRUCTION

Karl Rabe, Stuttgart, Germany, assignor to Dr. ing. h. c. F. Porsche, K.-G., Stuttgart Zuffenhausen, Germany, a company of Germany Application November 16, 1938, Serial No. 240,599
In Germany November 12, 1937

7 Claims. (Cl. 280—106)

This invention relates to a vehicle frame construction, and more particularly to a frame for a motor vehicle or an automobile.

An object of this invention is the production of a stiff vehicle frame which may be cheaply and easily made.

Another object of this invention is to provide a vehicle frame having a stiff central longitudinal beam with separate tubular transverse beams attached thereto.

A further object of this invention is to provide a vehicle frame including a central longitudinal beam formed from a pair of channeled pressed material members welded together, said members being formed with openings for control members and having control members connected thereto before being welded together.

Other objects and advantages of this invention will be apparent from the single embodiment thereof hereinafter disclosed in connection with the attached drawing, wherein:

Fig. 1 is a top plan view of a vehicle frame formed in accordance with this invention;

Fig. 2 is a broken vertical cross-sectional view taken along the line II—II of Fig. 1;

Fig. 3 is a transverse cross-sectional view along the line III—III of Fig. 1; and Fig. 4 is a horizontal section along the line IV—IV of Fig. 2, but drawn to a larger scale.

A preferred form of a vehicle frame formed in accordance with my invention is clearly illustrated in Fig. 1, wherein this frame is generally composed of a central longitudinal beam 1 made from two channeled members a, b, and transverse frame members 2, 2', 3, and 4.

If, as here shown, the vehicle wheels are to be independently sprung, bearings 5, 5' may be provided at the outer ends of the tubular members 2, 2' and these bearings support the swinging levers 6, 6'. The vehicle wheels at the ends of these levers are shown at 7 and 7'. Although these wheels may be sprung in any manner known to the art, I have found it convenient to use torsion rods 8, 8' which may be wholly enclosed and protected within the tubular frame members 2, 2' and connected at their outer ends to the swinging levers 6, 6'. The other ends of the torsion rods will be attached to the frame in any proper manner which, however, is not indicated in the drawing.

The transverse tubular frame member 4 may likewise be provided with wheel lever supporting bearings 10, 10', and a torsion rod 11 positioned within the transverse tubular member 4 as the springing means for the rear wheels. These wheels are interconnected with the torsion spring 11 through struts 12, 12' journaled in the bearings 10, 10' at one end, and interconnected with the rear swinging half axles 13, 13' at their other end. The wheels 15, 15' are suitably mounted at the outer ends of these axles.

If desired, the frame may be formed forked-shaped at one end of the vehicle, here indicated in the drawing as the rear end, to support a motor and its associated drive shown at 16, 17. The motor is supported at one point by a short transverse tubular member 23 which is mounted between the channeled extension 24, 24' forming the forked end of the central longitudinal beam 1. The specific means forming such an interconnection is unimportant but has been illustrated as bracket members 25, 25'. Another supporting point is formed at the bracket 27 shown as interconnecting the transverse tubular beam 4 with the engine transmission block 16.

As is clearly shown in Fig. 2, the two members a, b, making up the central longitudinal beam 1, are formed with rims 30 and may be firmly welded together along these rims. At the forward end of the completed beam a relatively short transversely extending strengthening member 31 is added and may be attached thereto by welding. The transverse tubular members 2, 2' are pressed against the member 31 and there firmly held in place relative to the central frame member 1 by suitable means here indicated as a clamping surrounding shell member 32. The member 32 may be interconnected with member 31 through bolts to firmly hold the tubes 2 and 2' in place. However, any suitable means performing the same function may be used, as will be apparent to those skilled in this art.

The transverse tubular member 3 which may be provided for supporting the vehicle superstructure, as for example, the main vehicle body, is preferably mounted in a transverse depression 33 formed on the upper surface of the upper member a forming part of the central longitudinal beam 1. The transverse tubular member 3 may be held in place in the depression 33 by welding or other suitable means.

One of the advantages of my construction is that it may be formed with control openings and members before assembly of the entire frame. As shown in Fig. 1, the central longitudinal beam, particularly the upper channeled member a, may be formed with an opening 34 for the gear shift and/or hand brake lever. Likewise, a gear shift guiding leaf or bracket 35 may be mounted within the channeled member a. The longitudinal beam may also be provided with guide openings 36, 36' formed by punching and drawing outwardly a portion of the channeled member a. These guide openings may be used for brake cables or the like going to the wheels 7, 7', and may be formed with a smooth curve in such a manner that the cables will not rub against and be damaged by the sharp edges.

The frame construction described above has several advantages over those now used in the prior art, particularly with respect to decreasing the cost of production without sacrificing any strength or rigidity of the final frame as contrasted, for example, with the frame disclosed in my prior joint Patent 2,133,633. The present construction in which the central longitudinal beam is formed from two channeled parts welded together entirely separately from the transverse beam members, is relatively light and can be formed on relatively small and cheap machinery. At the same time, however, the advantageous construction resulting in a stiff central member is preserved. The fact that the transverse members are formed separately and attached to this central longitudinal beam does not adversely affect the rigidity of the frame as a whole.

Another feature of my proposed construction is that the central longitudinal beam member may be formed with integral control openings and members as above described. The required openings may be punched into the upper channeled member, and this member being relatively light, can be easily handled for the necessary operations. Likewise, a control member such as the member 35 can be easily inserted. After the operations on the member a have been completed, it is then welded together with the member b to form the entire beam.

Many modifications of the construction described above will be apparent to those skilled in this art. For example, while the transverse frame members have all been indicated as tubular, they may be of any desired shape consistent with the type of frame to be formed. Additionally, the invention has been described in connection with a vehicle having independent wheel suspension; the type of suspension used, however, is of no particular importance. It will, furthermore, be apparent that if it is desired to place the vehicle engine at the front instead of the rear, my proposed construction may be reversed and obviously modified to suit this condition. It is also within the scope of this invention that the motor may replace a part of the central longitudinal beam so that the transverse beams may be interconnected with the motor housing instead of the central beam. The particular manner of supporting the engine from the vehicle frame is likewise unimportant. In some cases it may not be desirable or necessary to have both of the channeled members a and b extending upwardly to support the engine block and in those cases only one of these frame extensions will be necessary.

Accordingly, I do not intend to limit the scope of this invention to the single embodiment described and illustrated but as may be required by the following claims.

I claim:

1. A vehicle frame comprising a pair of flanged channel-shaped members attached together along their flanges to form a hollow rigid longitudinal beam, a first separable hollow tubular transverse beam attached to one end of said rigid beam, and a second hollow tubular beam extending transversely between the channel-shaped members near the other end of the longitudinal beam.

2. The combination according to claim 1, in combination with a third transverse beam intermediate said first and second transverse beams and mounted on one of said channel-shaped members.

3. A vehicle frame comprising a pair of flanged channel-shaped members attached together along their flanges to form a hollow longitudinal beam, in combination with hollow tubular wheel lever supporting arms, one of said arms being transversely mounted between said channel-shaped members through one end of the longitudinal beam, and means for releasably transversely mounting another of said arms to the other end of said longitudinal beam.

4. The combination according to claim 3, in which said last means comprises a clamping shell about said arm.

5. A vehicle frame comprising a pair of flanged channel-shaped members attached together one above the other to form a hollow longitudinal beam, the upper of said members being formed with a transverse depression in its top intermediate the ends of the longitudinal beam, a first hollow tubular transverse beam attached to one end of said longitudinal beam, a second hollow tubular beam extending transversely between the hollow-shaped members near the other end of the rigid beam, and a third hollow tubular beam mounted in said transverse depression and rigidly attached to said upper channel-shaped member.

6. A vehicle frame comprising a pair of flanged channel-shaped members forked at one end, attached together along their flanges and positioned one above the other to form a hollow central longitudinal beam with a forked extension, said beam being formed with an upper transverse depression, and a plurality of individual transverse beams attached to said longitudinal beam, one of said transverse beams being mounted in said depression.

7. A vehicle frame comprising a pair of flanged channel-shaped members forked at one end, attached together along their flanges and positioned one above the other to form a hollow central longitudinal beam with a forked extension, and a plurality of individual transverse beams attached to said longitudinal beam, one of said transverse beams being releasably attached at that end of the hollow central longitudinal beam opposite the forked extension.

KARL RABE.